US009991972B1

(12) United States Patent
Dogan et al.

(10) Patent No.: US 9,991,972 B1
(45) Date of Patent: Jun. 5, 2018

(54) REMOTE RADIO HEAD CALIBRATION

(71) Applicant: Cisco Technology, Inc., San Jose, CA (US)

(72) Inventors: Mithat C. Dogan, San Jose, CA (US); Matthew A. Silverman, Shaker Heights, OH (US); Paul J. Stager, Akron, OH (US); Brian D. Hart, Sunnyvale, CA (US); Jiunming Huang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/497,969

(22) Filed: Apr. 26, 2017

(51) Int. Cl.
*H04B 15/00* (2006.01)
*H04B 17/12* (2015.01)
*H04L 25/02* (2006.01)
*H04B 7/06* (2006.01)
*H04B 7/0413* (2017.01)

(52) U.S. Cl.
CPC .......... *H04B 17/12* (2015.01); *H04B 7/0413* (2013.01); *H04B 7/0617* (2013.01); *H04L 25/0202* (2013.01)

(58) Field of Classification Search
CPC ..... H04L 1/243; H04L 1/0001; H04L 1/0009; H04L 1/1854; H04L 25/03343; H04L 25/497; H04L 25/03057; G01R 31/31716; H04B 3/32; H04B 3/23
USPC ................ 375/219–228, 259–285, 295–297
See application file for complete search history.

(56) References Cited

U.S. PATENT DOCUMENTS

| | | | | |
|---|---|---|---|---|
| 6,144,711 A * | 11/2000 | Raleigh | ................ | H04B 7/0615 375/346 |
| 6,697,436 B1 * | 2/2004 | Wright | ............... | G01N 27/4163 330/106 |
| 6,829,550 B2 * | 12/2004 | Kim | ..................... | H04B 17/318 455/245.1 |
| 7,221,712 B1 * | 5/2007 | Schwartzman | .... | H04N 7/17309 348/E17.003 |
| 7,471,694 B2 * | 12/2008 | Kent | .................... | H04B 7/0848 370/310 |

(Continued)

OTHER PUBLICATIONS

Rodrigo C. de Lamare and Raimundo Sampaio-Neto, "Detection and Estimation Algorithms in Massive IMO Systems" Centre for Telecommunications Studies (CETUC) Pontifical Catholic University of Rio de Janeiro, Gàvea-22453-900, Rio de Janeiro, Brazil Communications Research Group Department of Electronics, University of York, York Y010 5DD, United Kingdom. arXiv:1408.4853v1 [cs.IT] Aug. 21, 2014. pp. 1-14. http://arxiv.org/pdf/1408.4853.pdf.

*Primary Examiner* — James M Perez
(74) *Attorney, Agent, or Firm* — Patterson + Sheridan, LLP (57) ABSTRACT

Embodiments herein describe calibrating a plurality of radio heads having a plurality of wireless antennas. In one embodiment, the plurality of radio heads communicate a calibration signal in a round robin fashion such that each of the radio heads communicates a respective calibration signal to the remaining radio heads. In one embodiment, at least one of the radio heads is isolated from the remaining radio heads. The received calibration signals are then used to calibrate the radio heads. In one embodiment, a controller coupled with the plurality of radio heads calibrates the radio heads. The calibrated radio heads then communicate to one or more client devices.

20 Claims, 6 Drawing Sheets

(56) References Cited

U.S. PATENT DOCUMENTS

| | | | |
|---|---|---|---|
| 7,593,493 B2* | 9/2009 | Kent | H04B 1/7097 375/349 |
| 7,680,461 B2* | 3/2010 | Takano | H04B 7/0615 370/328 |
| 7,787,520 B2* | 8/2010 | Kent | H04L 25/0204 342/174 |
| 8,023,554 B2* | 9/2011 | Kent | H04B 1/7115 375/144 |
| 8,098,776 B2* | 1/2012 | Kent | H04B 7/0697 375/141 |
| 8,111,789 B2* | 2/2012 | Kent | H04L 25/0204 342/377 |
| 8,311,166 B2* | 11/2012 | Kenington | H04B 17/21 370/334 |
| 8,422,540 B1* | 4/2013 | Negus | H04B 1/38 370/210 |
| 8,457,240 B2* | 6/2013 | Lee | H04B 7/0417 375/285 |
| 8,571,154 B1* | 10/2013 | Lackey | H04B 7/0837 375/284 |
| 8,861,637 B2* | 10/2014 | Na | H04L 25/03343 375/232 |
| 9,048,894 B2* | 6/2015 | Wang | H04B 7/043 |
| 9,337,886 B1* | 5/2016 | Dick | H04B 1/0475 |
| 9,510,237 B2* | 11/2016 | Nuss | H04W 28/08 |
| 9,596,120 B2* | 3/2017 | Yamanouchi | H03F 3/24 |
| 9,668,149 B1* | 5/2017 | Stager | H04L 43/16 |
| 9,729,396 B2* | 8/2017 | Rosa de Sousa Teixeira | H04L 41/0816 |
| 9,780,889 B1* | 10/2017 | Margulis | H04B 17/11 |
| 9,800,284 B2* | 10/2017 | Papadopoulos | H04B 1/40 |
| 9,843,479 B2* | 12/2017 | Rosa de Sousa Teixeira | H04L 41/0816 |
| 2002/0155818 A1* | 10/2002 | Boros | H01Q 1/246 455/67.14 |
| 2004/0087324 A1* | 5/2004 | Ketchum | H04B 7/0413 455/513 |
| 2005/0078762 A1* | 4/2005 | Ketchum | H04B 7/0417 375/267 |
| 2005/0215275 A1* | 9/2005 | Edwards | H04W 52/029 455/522 |
| 2007/0086536 A1* | 4/2007 | Ketchum | H04B 7/0413 375/260 |
| 2009/0109085 A1* | 4/2009 | Needham | G01S 7/4017 342/174 |
| 2010/0008406 A1* | 1/2010 | Sawai | H04L 25/03006 375/219 |
| 2010/0020857 A1* | 1/2010 | Takano | H04B 17/21 375/219 |
| 2010/0067588 A1* | 3/2010 | Takano | H04B 7/0689 375/260 |
| 2010/0087227 A1* | 4/2010 | Francos | H03F 1/3247 455/562.1 |
| 2010/0214169 A1* | 8/2010 | Kafle | H01Q 3/26 342/368 |
| 2010/0265922 A1* | 10/2010 | Bracha | H04W 74/0808 370/336 |
| 2010/0321233 A1* | 12/2010 | Ben-Zur | H01Q 3/267 342/174 |
| 2011/0053646 A1* | 3/2011 | Kundmann | H01Q 3/267 455/562.1 |
| 2011/0150050 A1* | 6/2011 | Trigui | H04B 7/0617 375/219 |
| 2011/0201269 A1* | 8/2011 | Hobbs | H04B 7/15535 455/9 |
| 2012/0281783 A1* | 11/2012 | Cheng | H04B 7/0456 375/295 |
| 2013/0094550 A1* | 4/2013 | Coan | H03F 1/3247 375/222 |
| 2013/0102254 A1* | 4/2013 | Cyzs | H04B 1/126 455/63.1 |
| 2013/0170578 A1* | 7/2013 | Wu | H04B 7/0426 375/295 |
| 2014/0212129 A1* | 7/2014 | Huang | H04W 48/20 398/2 |
| 2015/0117560 A1* | 4/2015 | Caimi | H01Q 5/22 375/267 |
| 2015/0222336 A1* | 8/2015 | Yilmaz | H04B 7/024 370/252 |
| 2015/0381217 A1* | 12/2015 | Kim | H03F 1/3247 375/297 |
| 2016/0094318 A1* | 3/2016 | Shattil | H04B 7/026 375/267 |
| 2016/0142094 A1* | 5/2016 | Papadopoulos | H04B 17/14 375/219 |
| 2016/0204811 A1* | 7/2016 | Goela | H04B 1/123 375/260 |
| 2017/0272180 A1* | 9/2017 | Jitsukawa | H04B 17/21 |
| 2017/0279545 A1* | 9/2017 | Margulis | H04B 17/11 |
| 2017/0346547 A1* | 11/2017 | Stager | H04B 7/0885 |

* cited by examiner

REMOTE RADIO HEAD CALIBRATION

TECHNICAL FIELD

Embodiments presented in this disclosure generally relate to calibrating wireless devices, and more specifically, to calibrating a radio head isolated from a plurality of radio heads.

BACKGROUND

In wireless communication systems, a client device communicates with an access point (AP) to utilize the wireless network associated with the AP. Modern wireless communication networks may have multiple APs having multiple radio heads (RHs) in order to provide multiple client devices simultaneous access to the wireless network. However, as the number of RHs in a system increases, so does the amount of interference caused by the RHs. Further, additional interference may come from other wireless devices outside of the wireless system. Thus, RHs may need to be calibrated to improve communication with clients of the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a method for calibrating a first radio head and a second radio head, wherein the first radio head and the second radio head each comprise a respective plurality of antennas. The method comprises transmitting, via the plurality of antennas of the first radio head, a first calibration signal to the second radio head. The method also comprises, upon determining the first radio head is isolated from the second radio head, re-transmitting the first calibration signal via beamforming of the plurality of antennas of the first radio head, wherein the plurality of antennas of the second radio head receives the re-transmitted calibration signal. The method further comprises transmitting, via the plurality of antennas of the second radio head, a second calibration signal to the first radio head. The method also comprises calibrating the first radio head and the second radio head based on a calibration vector determined from the first and second calibration signals received at the respective plurality of antennas of the first radio head and the second radio head.

One embodiment presented in this disclosure is a system, comprising a processor; and a memory comprising instructions which, when executed on the processor, performs an operation for calibrating a first radio head and a second radio head, wherein the first radio head and the second radio head comprise a respective plurality of antennas. The operation comprises transmitting, via the plurality of antennas of the first radio head, a first calibration signal to the second radio head. The operation also comprises, upon determining the first radio head is isolated from the second radio head, re-transmitting the first calibration signal via beamforming of the plurality of antennas of the first radio head, wherein the plurality of antennas of the second radio head receives the re-transmitted calibration signal. The operation further comprises transmitting, via the plurality of antennas of the second radio head, a second calibration signal to the first radio head. The operation also comprises calibrating the first radio head and the second radio head based on a calibration vector determined from the first and second calibration signals received at the respective plurality of antennas of the first radio head and the second radio head.

One embodiment presented in this disclosure is a computer program product for calibrating a first radio head and a second radio head, wherein the first radio head and the second radio head comprise a respective plurality of antennas. The computer program product comprises a non-transitory computer-readable medium having program instructions embodied therewith, the program instructions executable by a processor to perform an operation that comprises transmitting, via the plurality of antennas of the first radio head, a first calibration signal to the second radio head. The operation also comprises, upon determining the first radio head is isolated from the second radio head, re-transmitting the first calibration signal via beamforming of the plurality of antennas of the first radio head, wherein the plurality of antennas of the second radio head receives the re-transmitted calibration signal. The operation further comprises transmitting, via the plurality of antennas of the second radio head, a second calibration signal to the first radio head. The operation also comprises calibrating the first radio head and the second radio head based on a calibration vector determined from the first and second calibration signals received at the respective plurality of antennas of the first radio head and the second radio head.

Example Embodiments

In wireless communications, Multiple-Input and Multiple-Output (MIMO) is a method of communicating between multiple transmit and receive antennas to take advantage of spatial diversity and spatial multiplexing. In wireless networks, radio heads may utilize beamforming to improve communication among radio heads and/or client devices. Beamforming is a method that takes advantage of the channel characteristics of wireless networks. With beamforming, the phase and gain of a plurality of signals are altered in such a way to create constructive interference to improve the combined signals at a specific location. Thus, a MIMO system may use beamforming to provide improved signal strength at the location of a user.

A common wireless system used today is Wi-Fi, which is a Time Division Duplex (TDD) wireless system that uses a common frequency band to transmit and receive data by using the band over disjoint intervals. MIMO systems that utilize TDD either need explicit channel characteristics to determine spatial processing parameters or attempt to determine the channel characteristics implicitly by using multi-antenna samples to determine the transmit strategy per client. The channel characteristics define the amplitude and phase changes caused when wireless signals are transmitted in a communication channel between two network devices.

The explicit approach to determining the channel characteristics requires regular communication between the client and the multiple APs, which is expensive in terms of signaling cost. The APs comprise one or more radio heads (RH). A RH is a distributed transceiver that mixes down to baseband I/Q and feeds those samples back to the centralized processing system of the AP. The implicit approach relies on channel reciprocity between the communicating RHs. That is, the channel characteristics determined by the transmitter can be used to determine the channel characteristics for the receiver without communication among the radio heads. For example, the effective channel (observed at baseband) from a first RH A to a second RH B is the product of transmitter gain of RH A multiplied by the propagation channel which is multiplied by the receiver gain of RH B. In contrast, the effective channel from RH B to RH A is the product of transmitter gain of RH B multiplied by the propagation channel which is multiplied by the receiver gain of RH A.

Although the selected receiver and transmitter gains of RH A and RH B may be known, these are analog quantities that drift from the original specification of the RHs due to external factors such as manufacturing tolerances; aging; infeasibility of measuring due to large number of automatic gain control (AGC) states, power transmit states, bands and/or channels; etc. Thus, the implicit approach discussed above becomes less accurate in application because this approach relies on the original specification of the RHs and does not take into account interference that is present in real world situations. Therefore, a wireless network can be improved by calibrating the physical characteristics of the RHs.

For example, when the RHs are distributed to cover a larger area and are coordinated to form a coordinated remote radio head (RRH) cluster implementing MIMO technology, all transmit and receive chains of a RRH cluster can be jointly calibrated for reciprocity. However, because RRHs are separated from each other to cover a large area, channel estimates for calibrating tend to be noisy compared to calibrating the antennas of a single AP with a small distance between antennas.

Additionally, RRHs at the edge of the wireless system may receive interference from other wireless devices that do not belong to the wireless system. Thus, these RRHs may need to operate at a different wireless band to avoid the additional interference from devices not a part of the wireless system. However, operating at a different wireless band may cause the RRHs to be unable to cooperate with the other RRHs of the wireless system. Further, some of the RRHs may be relatively isolated from the rest of the system, which may cause channel estimates at an isolated radio head (IRH) to not be as accurate as compared to RRHs that are closer together. An IRH is a radio head that is communicatively isolated from the rest of the wireless system due to interference and/or an inability to communicate with the radio heads of the wireless system.

Figure 1:
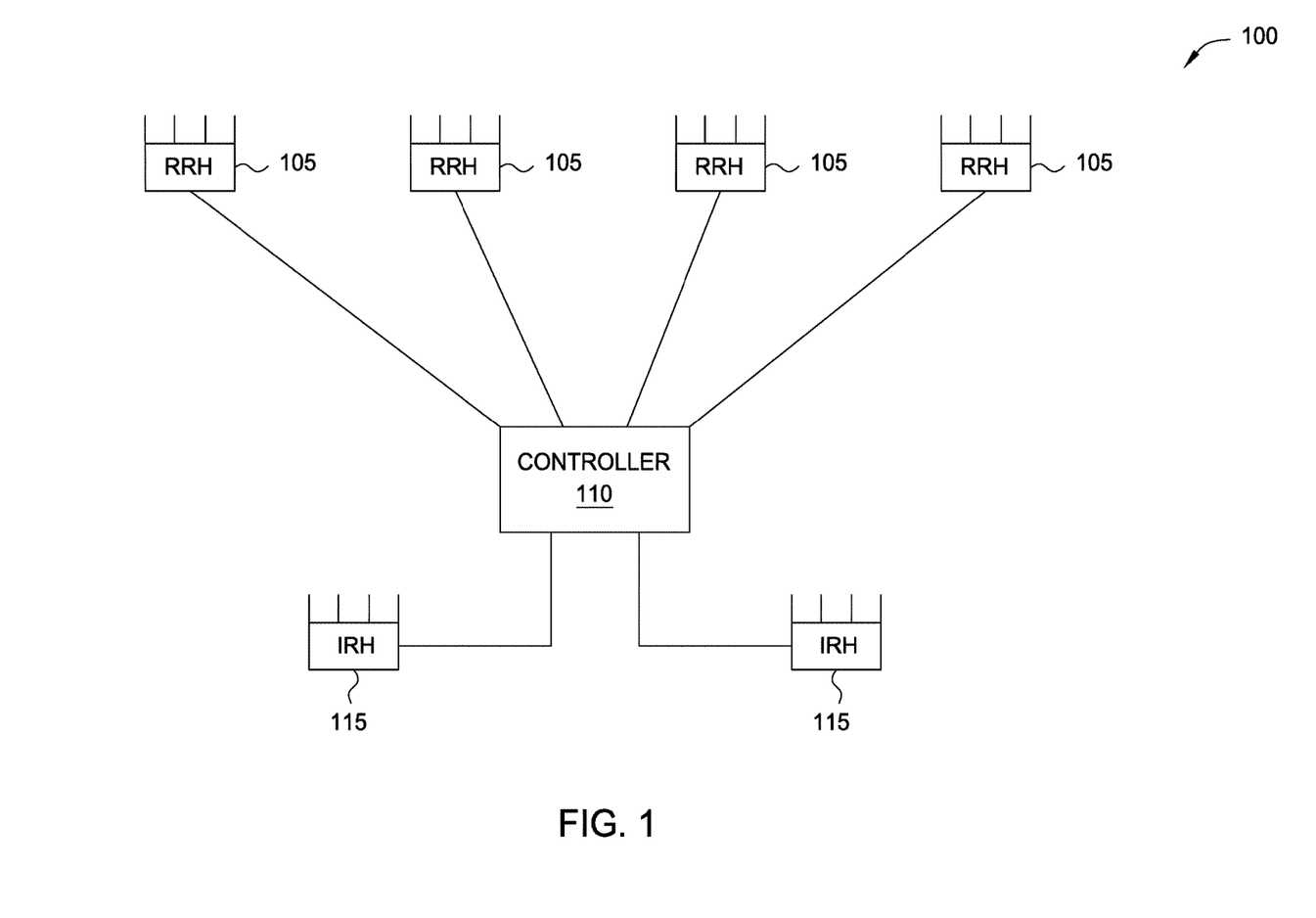
FIG. 1 illustrates a wireless system according to one embodiment disclosed herein.

FIG. 1 illustrates a wireless network having multiple remote radio heads and a controller, according to one embodiment herein. As shown in FIG. 1, the wireless network 100 includes four RRHs 105 and two IRHs 115. Further, the RRHs 105 and the IRHs 115 are connected with a controller 110. In one embodiment, the controller 110 is implemented as a single computing device having any suitable form. In other embodiments, the controller 110 is a distributed computing device and includes a plurality of discrete computing devices that are connected through wired or wireless networking. While four RRHs 105 and two IRHs 115 have been illustrated for simplicity, the system may contain any number and type of radio heads, and should not be limited to the embodiment shown.

In one embodiment, the controller 110 communicates with the RRHs 105 and the IRHs 115. For example, the RRHs 105 and IRHs 115 may be physically connected with the controller 110 via a wired connection, such as Ethernet cables, and the controller 110 communicates with the RRHs via the Ethernet cables. Further, the controller 110 may be connected to an external network (not shown), such as the Internet, or to additional RRHs 105 and/or IRHs 115.

As shown in FIG. 1, each of the RRHs 105 and each of the IRHs 115 have four wireless antennas for communicating with client devices (not shown). In one embodiment, the RRHs 105 and the IRHs 115 communicate using the 802.11 protocol and form a single network for communicating with client devices, such as a MIMO network. Further, the RRHs 105 and IRHs 115 may communicate with a client device using beamforming, as is known in the art. While the RRHs 105 and the IRHs 115 have been illustrated with four wireless antennas, it is to be understood that the RRHs 105 and the IRHs 115 may have any number of antennas and should not be limited only to four.

In one embodiment, the four RRHs 105 and the two IRHs 115, as well as their respective wireless antennas, are synchronized via the controller 110. That is, each of the RRHs 105 and the IRHs 115 operate in unison with one another based on commands from the controller 110. In this manner, all the RRHs 105 and the IRHs 115 are precisely synchronized during communication to client devices. In one embodiment, the controller 110 synchronizes the RRHs 105 and the IRHs 115 using a high precision clock signal that is transmitted to each of the RRHs 105 and the IRHs 115.

Figure 2:
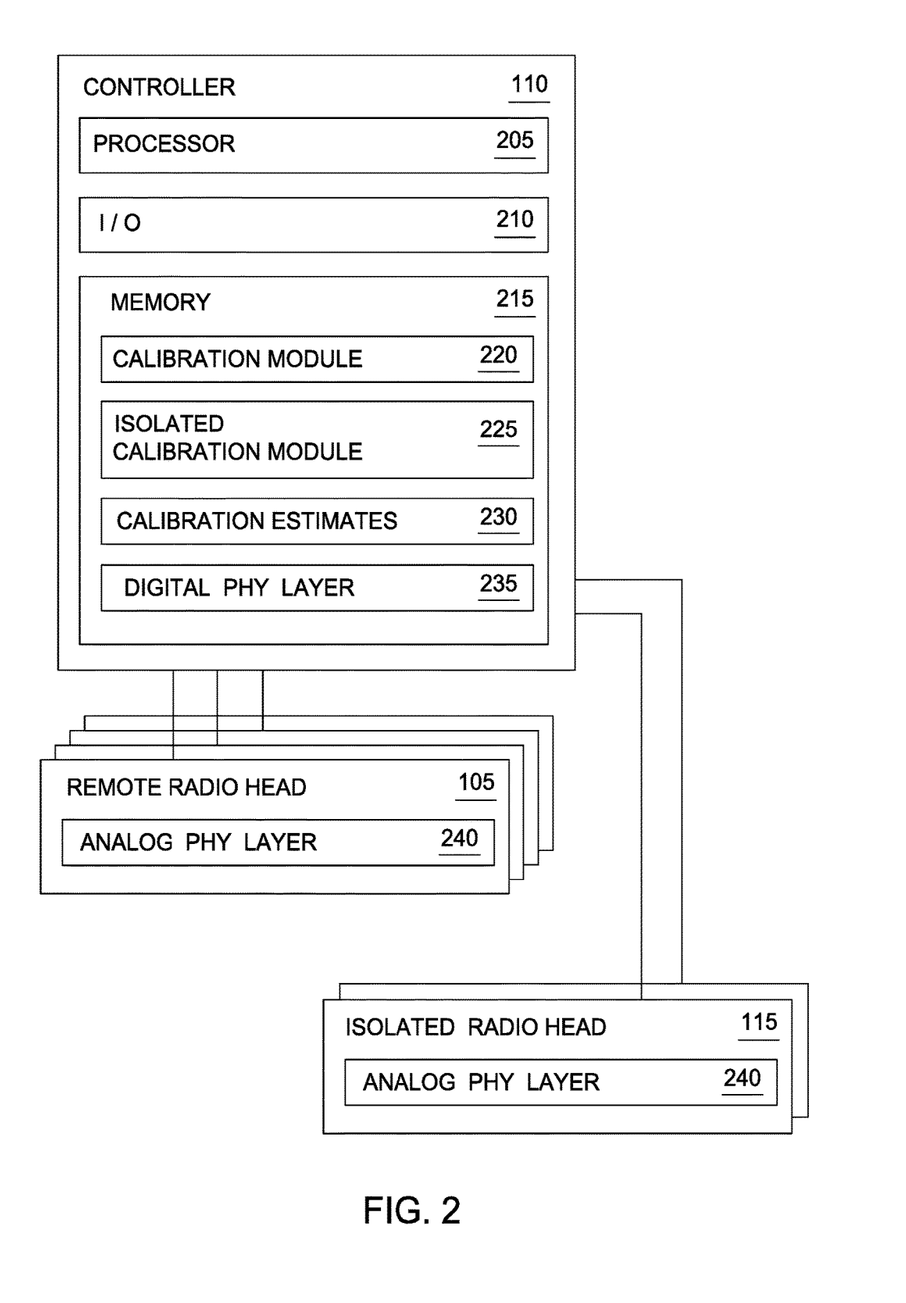
FIG. 2 illustrates a controller coupled with a plurality of radio heads, according to one embodiment disclosed herein.

Turning to FIG. 2, a detailed version of the controller 110, the RRHs 105, and the IRHs 115 of FIG. 1 are illustrated according to an embodiment. The controller 110 comprises a processor 205, an input/output (I/O) interface 210, and a memory 215. The processor 205 controls the operation of the controller 110. The I/O 210 allows the controller 110 to communicate with other electronic devices (e.g., the RRHs 105 and IRHs 115, client devices, network devices, etc.). For example, the I/O 210 may have physical data ports to establish a wired connection with the RRHs 105 and the IRHs 115. Further, the I/O 210 may be coupled with antennas for the controller 110 to communicate wirelessly.

The processor 205 may include any processing element suitable for performing functions described herein, and may include single or multiple core processors, as well as combinations thereof. While the controller 110 is shown as having a single processor 205, in alternative embodiments the controller 110 has a plurality of processors 205. The processor 205 may be included in a single computing device, or may represent an aggregation of processing elements included across a number of networked computing devices.

Memory 215 may include a variety of computer-readable media selected for their size, relative performance, or other capabilities: volatile and/or non-volatile media, removable and/or non-removable media, etc. Memory 215 may include cache, random access memory (RAM), Flash memory, a hard disk drive, a solid state drive, an optical storage device, and/or a magnetic storage device. As shown, the memory 215 includes the digital part of the PHY layer (i.e., Digital PHY Layer 235) of the RRHs 105 and the IRHs 115.

In one embodiment, the digital PHY layer 235 includes the functions for processing digital signals received at the RRHs 105 and the IRHs 115. In one embodiment, the memory 215 includes the MAC layer function of the RRHs 105 and the IRHs 115. Further, the MAC layer may include functions for channel access control. Thus, in one embodiment, the central controller 110 performs the digital PHY layer functions and the MAC layer functions for all of the RRHs 105 and the IRHs 115. While the digital PHY layer 235 and the MAC layer have been described as being within memory 215, a person skilled in the art would appreciate that the PHY layer and the MAC layer may be hardware, software, or a combination of hardware and software.

As shown, memory 215 also comprises calibration module 220, isolated calibration module 225, and calibration estimates 230. In one embodiment, the calibration module 220 and the isolated calibration module 225 comprise program code that when executed by the processor 205 perform a variety of functions for calibrating radio heads of the system. In another embodiment, calibration module 220 performs an operation for calibrating a plurality of radio heads, as will be discussed in further detail below with regards to FIG. 3. In one embodiment, isolated calibration module 225 performs an operation for calibrating a plurality of radio heads, as will be discussed in further detail below with regards to FIG. 5. The calibration module 220 calibrates the radio heads separately from an isolated radio head, whereas the isolated calibration module 225 calibrates all of the radio heads as if they are isolated radio heads and then calibrates the radio heads together. Those skilled in the art should appreciate that memory 215 may contain additional items such as firmware for operating the controller 110, which have not been illustrated for simplicity.

Calibration estimates 230 are estimates compiled from the calibration module 220 and the isolated calibration module 225. In one embodiment, the calibration estimates 230 comprise a matrix containing calibration estimates for all of the antennas of each of the respective RRHs 105 and/or IRHs 115 being calibrated. In another embodiment, the calibration estimates 230 comprise channel estimates obtained by each RRH 105 and/or IRH 115 at each of their respective antennas from the antennas of the remaining RRHs 105 and/or IRHs 115. For example, if there are two RRHs 105 that each have four antennas, each antenna of the first RH will have four calibration estimates, which is one calibration estimate for each of the antennas of the second RH. Thus, with there will be thirty-two calibration estimates in total. While calibration estimates 230 have been described with reference to RRHs 105 for simplicity, it should be understood by a person skilled in the art that the calibration estimates 230 also contain calibration estimates from the IRHs 115. Further, while calibration estimates 230 have been described as a being stored in a matrix for simplicity, it should be understood by a person skilled in the art that any method of storing the calibration estimates 230 is possible.

The RRHs 105 and IRHs 115 are illustrated with an analog PHY layer 240 that receives and transmits wireless signals (i.e., an analog interface), while the central controller 110 includes a digital portion of a PHY layer and a MAC layer for processing received packets and transmitting packets to the RRHs 105 and IRHs 115. Thus, the PHY layer may be split between the RRHs 105 and the IRHs 115, and the central controller 110 where the higher level processing layers are in the central controller 110. However, in one embodiment, the RRHs 105 and IRHs 115 comprise a processor (not shown) and memory (not shown) for processing digital signals received via the PHY layer. The RRHs 105 and IRHs 115 may also include high-level processing layers (e.g., MAC or physical coding sublayer (PCS)) to evaluate the received packets.

Although not shown, the RRHs 105 and IRHs 115 may include one or more antennas for wireless communication. In one embodiment, the RRHs 105 and IRHs 115 are capable of communicating using the 802.11 wireless communication standard via the one or more antennas. In another embodiment, the RRHs 105 and IRHs 115 are capable of communicating with a cellular network. Further, the RRHs 105 and IRHs 115 may comprise a plurality of antennas for communicating using different standards. For example, one antenna may be capable of communicating using the 802.11 wireless standard, while another antenna is capable of communicating with a cellular network. Thus, in some embodiments, the RRHs 105 and IRHs 115 can communicate using a plurality of wireless networks.

Figure 3:
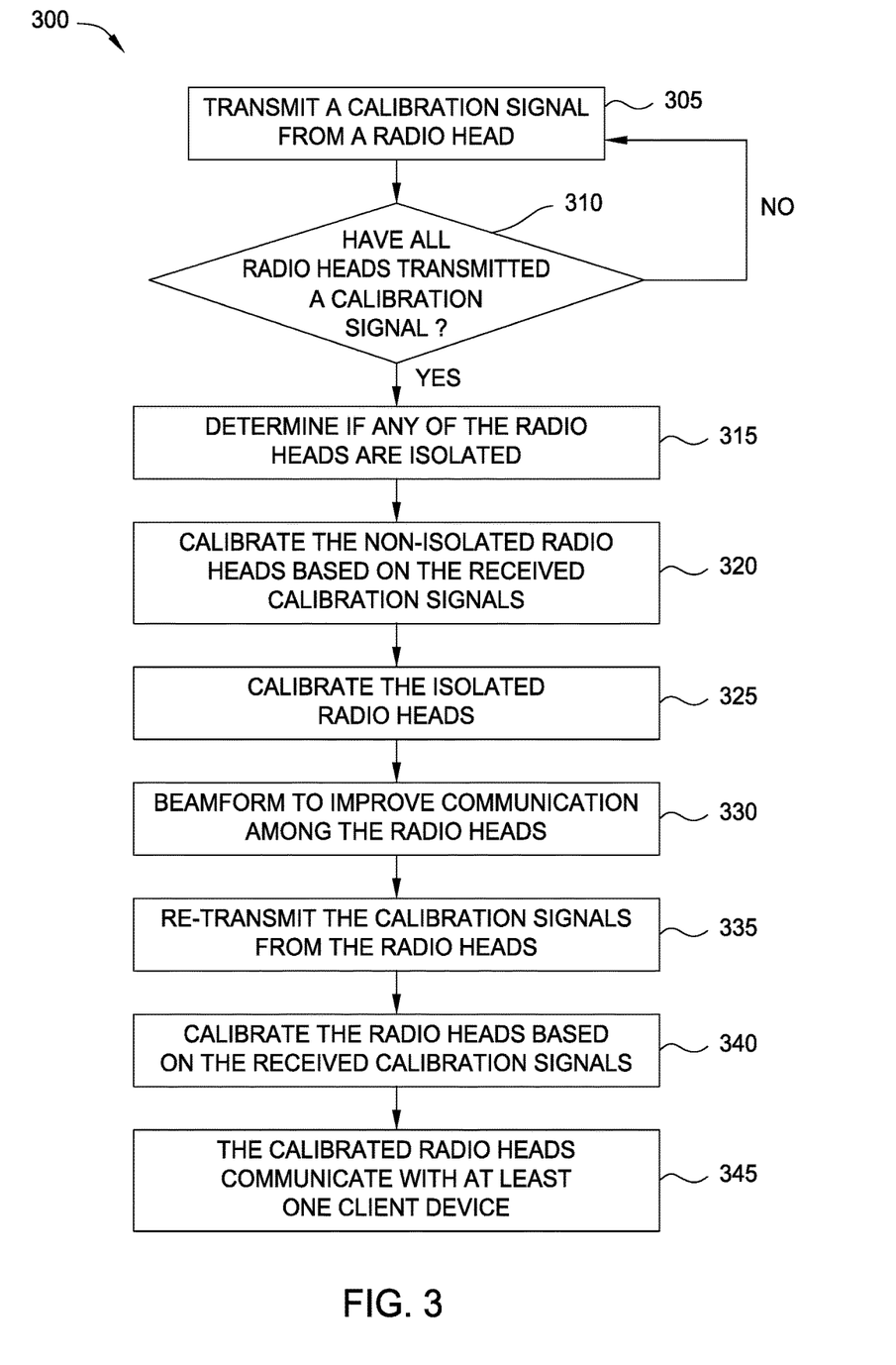
FIG. 3 is a method of calibrating a plurality of radio heads in a wireless system, according to one embodiment disclosed herein.

FIG. 3 illustrates a method 300 for calibrating the RRHs 105 and the IRHs 115 of FIG. 1. While a network containing four RRHs 105 and two IRHs 115 each having four antennas is used for ease of explanation of the method, any number of RRHs 105 and IRHs 115 having any number of antennas can be calibrated using the method 300. For ease of explanation, the four RRHs 105 of FIG. 1 are referred to as W, X, Y, and Z; while the two IRHs 115 are referred to as I and J. Each antenna of the respective radio heads is designated with a number. For example, the first antenna of RH W is referred to as $W_1$, the second as $W_2$, and so forth.

The method begins at block 305, where a first RH transmits a calibration signal. In one embodiment, the calibration signal is a calibration packet, which is a Null Data Packet (NDP) consisting of a PHY preamble containing one or more 802.11 wireless standard training fields to fully sound the channel. In another embodiment, the controller 110 derives the channel estimate from the High Throughput (HT), Very High Throughput (VHT), or High Efficiency-Long Training Field (HT/VHT/HE-LTF field) of the NDP. The NDP may include multiple copies of the HT/VHT/HE-LTF field for increased immunity against interference and noise.

For example, W transmits a calibration signal via the four antennas of W that is received at X, Y, and Z, as well as I and J. Thus, each antenna of X, Y, and Z receives a calibration signal from each of the four antennas of W. Therefore, $X_1$ receives a separate signal from $W_1$, $W_2$, $W_3$, and $W_4$; $X_2$ receives a separate calibration signal from $W_1$, $W_2$, $W_3$, and $W_4$ and so forth for each of the antennas of X, Y, and Z. Based upon each of the received signals, a respective channel estimate representing the channel characteristics is determined between the antennas that sent the calibration signals and the antennas that received the calibration signals. The radio heads I and J may not receive the calibration signals sent by the other radio heads because RHs I and J are isolated as will be discussed in more detail below. In one embodiment, the channel estimates are derived from the preamble of the calibration signal and stored in a matrix for later calibration. In another embodiment, the controller 110 causes the RHs I, J, W, X, Y, and Z to each take turns transmitting the calibration signal. In one embodiment, the periods in which the RHs transmit are non-overlapping such that only a single RH is transmitting at a time.

At block 310, if all the RHs of the system have transmitted a calibration signal, the method continues to block 315. However, if all the RHs of the system have not transmitted a calibration signal, the method returns to block 305 to allow the remaining RHs to transmit a calibration signal. In one embodiment, at block 310 the RHs transmit a calibration signal one at a time in a round robin fashion until all RHs have transmitted a calibration signal.

At block 315, the calibration module 220 determines if any of the RHs are isolated from the remaining RHs. That is, the radio heads may be placed far enough apart (e.g., isolated) from one another that the channel estimates from individual antenna transmissions, which are non-directional, between the radio heads may not yield sufficient channel estimates (e.g., the channel estimate does not have enough power; too much interference exists; etc.). In one embodiment, a RH is considered isolated when the calibration signal from the RH does not activate the analog automatic gain control (AGC). In another embodiment, a RH is considered isolated when the calibration signal from the RH is not strong enough to trigger a start of packet (SOP) detect. In this example, RH I broadcasts a calibration signal to the remaining RHs J, W, X, Y, and Z, but RH I is sufficiently far away such that the calibration signal degrades to the point that the signal is no longer detectable by the remaining RHs.

In another embodiment, a RH is considered isolated when the calibration signal is detected by the remaining RHs, but there is significant interference (e.g., from devices outside the wireless system) with the calibration signal such that the signal cannot be considered reliable. For example, RH J broadcasts a calibration signal to the RHs W, X, Y, and Z which receive the calibration signal, but RH I does not receive the calibration signal because, as stated above, RH I is too far away to communicate with RH J. Thus, RHs W, X, Y, and Z receive the calibration signal from RH J, but the signal to noise ratio (SNR) of the calibration signal is sufficiently low that the calibration signal cannot be considered reliable. Some examples of a low SNR may be 0.0001, 0.005, 0.1, 1, 5, etc. decibels (dB). While specific examples have been provided for an unreliable SNR for ease of explanation, a person skilled in the art would recognize that certain applications may require more or less reliability, which would relate to a higher or lower SNR. Thus, the invention should not be limited to the previously discussed examples.

At block 320 the controller calibrates the non-isolated RHs. That is, RHs W, X, Y, and Z are calibrated before the isolated RHs I and J. While the method 300 is described with the non-isolated RHs being calibrated before the isolated RHs for convenience, a person skilled in the art would appreciate that the isolated RHs may be calibrated before, or at the same time as, the non-isolated RHs are calibrated. In one embodiment, the phase and amplitude imbalances between the transmit and receive paths of the RHs are calibrated as a function of frequency. In another embodiment, all of the transmit and receive paths for all the RHs are calibrated. In a further embodiment, some (e.g., 99%, 95%, 75%, 50%, etc.) of the transmit and receive paths of the RHs are calibrated. The calibration may be per band on the current channel, per band on a different channel, per block of subcarrier, and/or per individual subcarrier. Further, the bulk timing differences between the RHs and the controller are calibrated.

In one embodiment, calibration coefficients are used to calibrate the RHs, which are determined from the transmitted and received calibration signals. In another embodiment, the calibration coefficients are complex numbers that represent the phase and amplitude adjustment required for the receive path and transmit path so that the multi-RH channel becomes reciprocal. By calibrating the RHs, complete knowledge of the wireless channel is determined to allow for improved communication to client devices. In a further embodiment, once the RHs are calibrated, the RHs are capable of using beamforming to improve communications with client devices with minimal impact from external factors. Further, the methods of calibration described below provide significant cost savings in terms of processing power required compared to explicit calibration, while at the same time providing similar benefits to explicit calibration.

In one embodiment, the gains of RHs W, X, Y, and Z are determined from the sent and received calibration signals. In another embodiment, each antenna of the RHs is calibrated with a respective gain based on the sent and received calibration signals. In a further embodiment, the calibration of the RHs is a calibration vector determined as the right singular vector of a matrix (Z) comprising the estimated channels for each RH. In another embodiment, the calibration of the RHs is a calibration vector determined as the eigenvector with the smallest eigenvalue of R, which is a $Z'^*Z$ matrix.

To better explain how the channel estimate is determined and stored, an example is provided for channel estimates between two radio heads A and B. As mentioned above, the effective channel (observed at baseband) from a first RH A to a second RH B is the product of transmitter gain of RH A multiplied by the propagation channel multiplied by the receiver gain of RH B. Thus, rewritten in equation form, $B=R_B H_{AB} T_A$ where B is the channel estimate at RH B when radio head A is transmitting. In one embodiment, B is an M×M matrix that is not sparse. $R_B$ is a matrix comprising receive path responses for radio head B. $T_A$ is a matrix holding transmit path response for radio head A. $H_{AB}$ is the propagation channel matrix between the antennas of RH A and the antennas of RH B. The channel estimate at the j-th antenna of RH B when the i-th antenna of RH A is transmitting is defined as $b_{j,i}$.

Similarly, the effective channel from RH B to RH A is the product of transmitter gain of RH B multiplied by the propagation channel multiplied by the receiver gain of RH A. Rewritten in equation form, $A=R_A H_{BA} T_B$. Due to reciprocity, $A=R_A H_{BA} T_B = R_A (H_{AB})^T T_B$. In one embodiment, A is a M×M matrix that is not sparse, $R_A$ is a matrix comprising receive path responses for radio head A, and $T_B$ is a matrix holding transmit path response for radio head B. $H_{BA}$ is the propagation channel matrix between the antennas of RH B and the antennas of RH A. The channel estimate at the j-th antenna of RH A when the i-th antenna of RH B is transmitting is defined as $a_{j,i}$.

Given the above definitions, the channel estimate at the i-th antenna of A when the j-th antenna of B is transmitting is $a_{i,j}=r_{a,i}*h_{i,j}*t_{b,j}$, where $t_{b,j}$ is the transmit gain at the j-th antenna of B, $r_{a,i}$ is the receive gain at the i-th antenna of A, and $h_{i,j}$ is the propagation channel between the two radio heads. Of note, the propagation channel is reciprocal, which means that $h_{i,j}=h_{j,i}$.

Similarly, the channel estimate at the j-th antenna of B when the i-th antenna of A is transmitting is $b_{j,i}=r_{b,j}*h_{i,j}*t_{a,i}$, where $t_{a,i}$ is the transmit gain at the i-th antenna of A, $r_{b,j}$ is the receive gain at the j-th antenna of B, and $h_{i,j}$ is the propagation channel between the two radio heads. Of note, the propagation channel is reciprocal, which means that $h_{i,j} = h_{j,i}$.

Using the above formulas, the equivalent of the matrix relationship for calibration coefficients is obtained which can be proved by substitution as follows:

$$a_{i,j} \cdot \left(\frac{r_{b,j}}{t_{b,j}}\right) = b_{j,i} \cdot \left(\frac{r_{a,i}}{t_{a,i}}\right) \rightarrow b_{j,i} \cdot c_A(i) - a_{i,j} \cdot c_B(j) = 0$$

This relationship translates into the following matrix equation for the calibration coefficients for both radio heads. In the below matrix, $Zx=0$ and $x\neq 0$. In this manner, a matrix is populated with the channel estimates for each antenna of RH A and RH B. This matrix can then be used to solve the calibration coefficients for each of the antennas of RH A and RH B in order to calibrate the RHs.

$$\underbrace{\begin{bmatrix} b_{1,1} & 0 & \cdots & 0 & -a_{1,1} & 0 & \cdots & 0 \\ b_{2,1} & 0 & \ddots & \vdots & 0 & -a_{1,2} & \ddots & \vdots \\ \vdots & \vdots & \ddots & 0 & \vdots & \ddots & \ddots & 0 \\ b_{M,1} & 0 & \cdots & 0 & 0 & \cdots & 0 & -a_{1,M} \\ 0 & b_{1,2} & 0 & 0 & -a_{2,1} & 0 & \cdots & 0 \\ 0 & b_{2,2} & \vdots & \vdots & 0 & -a_{2,2} & \ddots & \vdots \\ \vdots & \vdots & \vdots & \vdots & \vdots & \ddots & \ddots & 0 \\ 0 & b_{M,2} & 0 & 0 & 0 & \cdots & 0 & -a_{2,M} \\ & & & \vdots & & & \vdots & \\ 0 & 0 & 0 & b_{1,M} & -a_{M,1} & 0 & \cdots & 0 \\ 0 & 0 & 0 & b_{2,M} & 0 & -a_{M,2} & \ddots & \vdots \\ \vdots & \vdots & \vdots & \vdots & \vdots & \ddots & \ddots & 0 \\ 0 & 0 & 0 & b_{M,M} & 0 & \cdots & 0 & -a_{M,M} \end{bmatrix}}_{Z\ M^2 \times 2M}$$

$$\underbrace{\begin{bmatrix} c_A(1) \\ c_A(2) \\ \vdots \\ c_A(M) \\ \hline c_B(1) \\ c_B(2) \\ \vdots \\ c_B(M) \end{bmatrix}}_{x\ 2M\times 1} = \begin{bmatrix} 0 \\ 0 \\ \vdots \\ 0 \end{bmatrix}_{M^2 \times 1}$$

The calibration vector $c_A$ for RH A is an M×1 vector which is the diagonal elements of $R_A(T_A)^{-1}=(T_A)^{-1} R_A$. Likewise, the calibration vector $c_B$ for RH B is an M×1 vector which is the diagonal elements of $R_B(T_B)^{-1}=(T_B)^{-1} R_B$. The solution for the calibration coefficients of the radio heads is the matrix x above, which is the right singular vector of the matrix Z, defined above, with the smallest singular value. Ideally, the smallest singular value is zero. Further, the solution to $Zx=0$, as the right singular vector of Z with the lowest singular value is the least squares solution.

Since Z is a $M^2 \times 2M$ matrix, its rank can be at most $2M$ with estimation errors when $M>1$. In one embodiment, the rank of Z is $2M-1$ for a unique solution to the calibration coefficients. However, under adverse conditions, the rank of Z may be less than that. For example, if the first antenna of RH B does not receive any energy from RH A transmissions, and due to reciprocity the RH A receivers do not receive any energy from the first antenna of RH B, the rank of Z drops by two since the first column and the (M+1)th columns of Z are zero. However, because the channel estimates are determined when forming Z, the channel estimates that are close to zero may be removed from Z, and Z can be solved for the valid set of identifiable calibration factors. In one embodiment, the unidentifiable calibration factors may be estimated via calibration with a different RH. In another embodiment, the unidentifiable calibration factors may determine from self-calibration among the antennas of the same RH.

Thus, an example of a calibration vector when two RHs (A and B) are signaling each other in block form is produced below:

$$F_A(B) = \begin{bmatrix} b_{1,1} & 0 & \cdots & 0 \\ b_{2,1} & 0 & \ddots & \vdots \\ \vdots & \vdots & \ddots & 0 \\ b_{M,1} & 0 & \cdots & 0 \\ 0 & b_{1,2} & 0 & 0 \\ 0 & b_{2,2} & \vdots & \vdots \\ \vdots & \vdots & \vdots & \vdots \\ 0 & b_{M,2} & 0 & 0 \\ & & \vdots & \\ 0 & 0 & 0 & b_{1,M} \\ 0 & 0 & 0 & b_{2,M} \\ \vdots & \vdots & \vdots & \vdots \\ 0 & 0 & 0 & b_{M,M} \end{bmatrix}$$

and $$G_B(A) = \begin{bmatrix} -a_{1,1} & 0 & \cdots & 0 \\ 0 & -a_{1,2} & \ddots & \vdots \\ \vdots & \ddots & \ddots & 0 \\ 0 & \cdots & 0 & -a_{1,M} \\ -a_{2,1} & 0 & \cdots & 0 \\ 0 & -a_{2,2} & \ddots & \vdots \\ \vdots & \ddots & \ddots & 0 \\ 0 & \cdots & 0 & -a_{2,M} \\ & \vdots & & \\ -a_{M,1} & 0 & \cdots & 0 \\ 0 & -a_{M,2} & \ddots & \vdots \\ \vdots & \ddots & \ddots & 0 \\ 0 & \cdots & 0 & -a_{M,M} \end{bmatrix}$$

$F_A(B)$ consists of the channel estimates obtained by RH B when RH A is transmitting. That is, $b_{i,j}$ is the channel estimate at RH B's i-th antenna when RH A's j-th antenna is transmitting. $G_B(A)$ consists of channel estimates obtained by RH A when RH B is transmitting. That is, $a_{i,j}$ is the channel estimate of RH A's i-th antenna when RH B's j-th antenna is transmitting.

Applying the definitions above:

$$\underbrace{[F_A(B) \quad G_B(A)]}_{Z} \begin{bmatrix} c_A \\ c_B \end{bmatrix} = 0_{2M \times 1}$$

Using the aforementioned matrix, and applying it to the RRHs 105 of the system of FIG. 1 (i.e., four RHs (W, X, Y, and Z) each having four antennas) that have provided the calibration signal in a round robin fashion results in the following matrix referred to as $Z_{system}$. The calibration vectors for W, X, Y, and Z are also shown.

$$\underbrace{\begin{bmatrix} F_A(B) & G_B(A) & 0 & 0 \\ F_A(C) & 0 & G_C(A) & 0 \\ F_A(D) & 0 & 0 & G_D(A) \\ 0 & F_B(C) & G_C(B) & 0 \\ 0 & F_B(D) & 0 & G_D(B) \\ 0 & 0 & F_C(D) & G_D(C) \end{bmatrix}}_{Z_{system}} \begin{bmatrix} c_A \\ c_B \\ c_C \\ c_D \end{bmatrix} = 0$$

Every block submatrix of the coefficient matrix $Z_{system}$ is ($M^2 \times M$), resulting in a ($M^2*H*(H-1)/2 \times M*H$) coefficient matrix. Although the size of $Z_{system}$ is large, we can determine the calibration coefficients by determining the eigenvector with the smallest eigenvalue. In one embodiment, singular value decomposition (SVD) is used to determine the eigenvector of the matrix.

Once the calibration coefficients are determined from the matrix, the gains can be determined for each of the RHs W, X, Y, and Z. For example, returning to the example above with RHs A and B, the effective channel (observed at baseband) from a first RH A to a second RH B is the product of transmitter gain of RH A multiplied by the propagation channel multiplied by the receiver gain of RH B. Thus, rewritten in equation form, $B = R_B H_{AB} T_A$ where B is the channel estimate at RH B when radio head A is transmitting. Since each of the RHs has received a signal from the remaining RHs which allows the RH to determine the receiver gain, as well as the channel estimates, the controller can use the reciprocity described above to solve for the transmitter gain. Thus, the determined calibration coefficients are used to determine the gains of the antennas. In one embodiment, the calibration coefficients are complex numbers that represent the phase and amplitude adjustment required for each receive and transmit path so that the channel becomes reciprocal among the plurality of RHs. In another embodiment, the channel estimates are used to determine the implicit channel (i.e., the uplink channel) measurements among the RHs and calibrate the implicit channel measurements to determine the downlink channel. In this manner, the RHs W, X, Y, and Z are calibrated together.

Figure 4A:
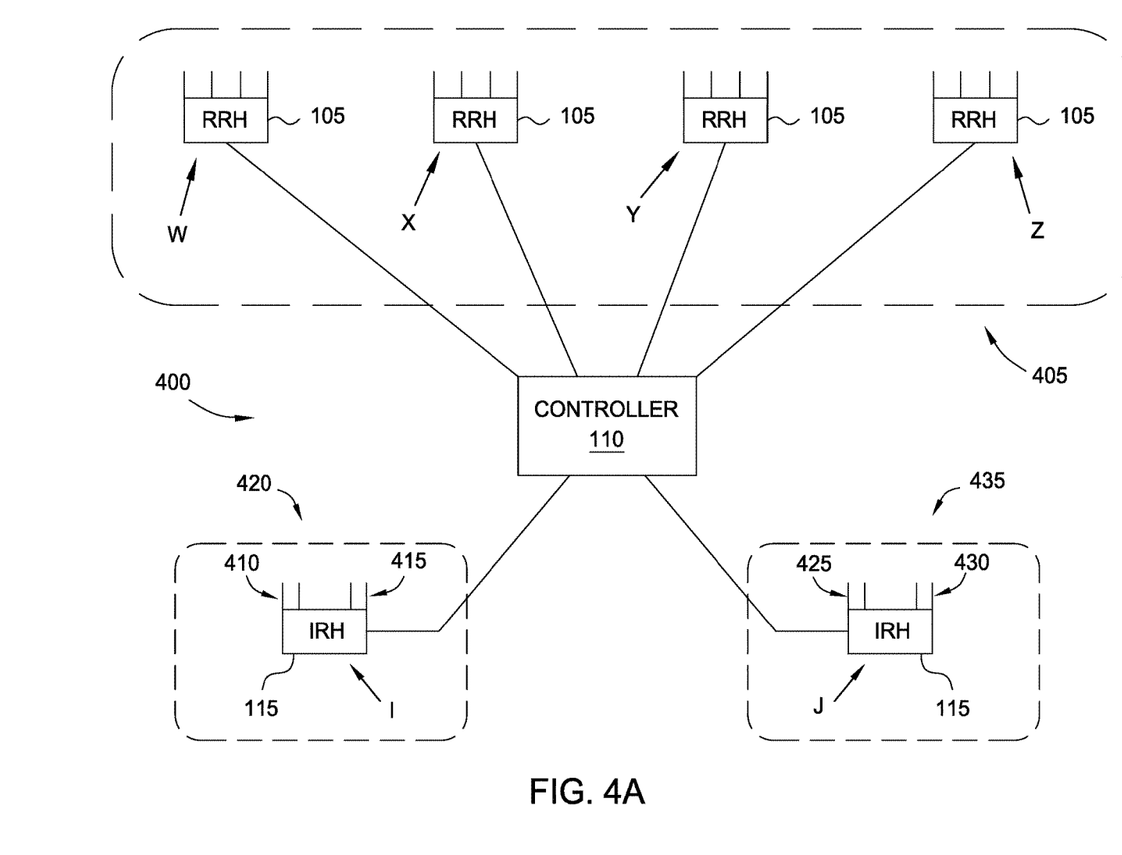
FIGS. 4A-4B illustrate a wireless system before and after a plurality of radio heads are calibrated, according to one embodiment disclosed herein.

Turning to FIG. 4A, a system 400 is illustrated, which is the system of FIG. 1 after the RRHs 105 (i.e., RHs W, X, Y, and Z mentioned above) are calibrated. As illustrated in FIG. 4A, the RRHs 105 are calibrated together as shown by the wireless signal propagation as represented by the dashed lines. The IRHs 115 (i.e., RHs I and J mentioned above) have not been calibrated as shown by each IRH being isolated with their own respective wireless signal propagation 420 and 435 not reaching any other radio heads.

Returning to FIG. 3 with reference to FIG. 4A, at block 325 the controller calibrates the isolated radio heads (i.e., RHs I and J). In one embodiment, the antennas of the IRHs 115 are calibrated as disjoint RHs to improve the signal of the IRHs 115. Stated differently, the antennas of the IRHs 115 are treated as if they are independent radio heads so that the antennas may be calibrated as individual radio heads in the same fashion as described above.

In one embodiment, the antennas are calibrated in the same manner as explained with reference block 320. For example, as shown in FIG. 4A, IRHs 115 (i.e., RHs I and J) each comprise four antennas. The four antennas may be calibrated as two separate radio heads. That is, the two antennas 410 of IRH I are treated as a first RH and the two antennas 415 of IRH I are treated as a second RH. While each IRH 115 is illustrated as having a total of four antennas for ease of explanation, the IRHs 115 may have any number of antennas (e.g., 2, 3, 4, 5, 50, etc.). Further, while the antennas of the IRHs 115 have been grouped in twos, any number of antennas may be grouped together (e.g., 1, 2, 3, 5, 50, etc.).

In one embodiment, the antennas 410 of IRH I transmits a calibration signal in a round robin fashion, while the antennas 415 receive the calibration signal. Next, the antennas 415 of IRH I transmit a calibration signal in a round robin fashion, while the antennas 410 receive the calibration signal. The received calibration signals are stored in a matrix. The antennas 410 and 415 are then calibrated based on the calibration signals stored in the matrix. Thus, the antennas 410 and 415 of IRH I may be calibrated to communicate together as two disjoint sets of antennas, instead of as a single group of antennas.

Turning to IRH J, in one embodiment the antennas 425 are treated as a first RH and the antennas 430 are treated as a second RH. The antennas 425 transmit a calibration signal in a round robin fashion, while the antennas 430 receive the calibration signal. Next, the antennas 430 transmit a calibration signal in a round robin fashion, while the antennas 425 receive the calibration signal. The received calibration signals are stored in a matrix. The antennas 425 and 430 are then calibrated based on the calibration signals stored in the matrix. Thus, the antennas 425 and 430 of IRH J may be calibrated to communicate together as two disjoint sets of antennas, instead of as a single group of antennas.

While a brief overview has been provided of the detailed calibration described above for ease of explanation, a person skilled in the art will appreciate that the calibration of the antennas 410, 415, 425, and 430 may comprise all of the steps of the calibration described with regards to the RRHs 105. Further, while the calibration of the IRHs 115 and their respective antennas are described in a specific order, a person skilled in the art will appreciate that the IRHs 115 and their respective antennas may be calibrated in any order, and should not be limited to the embodiments described above.

At block 330, the radio heads beamform to improve communication among the radio heads. In one embodiment, once the antennas of the IRHs 115 are calibrated, each of the IRHs 115 are capable of independently beamforming using the calibrated antennas. That is, IRH I is capable of beamforming using the calibrated antennas 410 and 415, while IRH J is capable of beamforming using the calibrated antennas 425 and 430. In another embodiment, the IRHs beamform towards the RRHs 105 (e.g., RHs W, X, Y, and Z), which will be described in more detail below. In an alternative embodiment, the RRHs 105 (e.g., RHs W, X, Y, and Z) beamform towards the IRHs 115 (e.g., RHs I and J). In further embodiment, the IRHs 115 beamform towards the RRHs 105, while the RRHs 105 beamform towards the IRHs 115. By beamforming, the RRHs 105 and the IRHs 115 increase the strength of the signals sent by the radio heads. While beamforming has been described with relation to specific radio heads, a person skilled in the art would appreciate that any one or more radio heads of the system may beamform to any one or more other radio heads of the system, and should not be limited to the examples provided above.

For beamforming between radio heads to be effective, the controller 110 determines the ideal beamforming characteristics for the radio heads. As mentioned above with reference to FIG. 1, the radio heads are communicatively coupled with the controller 110 and synchronized via a common clock. Thus, the controller 110 can determine which radio head sent a calibration signal when it is received at a different radio head. Based on the received calibration signal, the controller 110 determines channel characteristics to allow the radio heads to properly beamform with one another. In one embodiment, where the calibration signal from the IRHs 115 has been detected, but the SNR is too low, the controller 110 is capable of determining channel estimates, or the proper beamforming characteristics, for the radio heads based on the received signal. Therefore, the controller 110 can determine the beamforming characteristics based on the received calibration signal even if the SNR is not sufficiently high. In another embodiment, the controller 110 can determine the beamforming characteristics for the IRH that is sending the calibration signal as well as for the radio head receiving the signal. In this manner, the controller 110 determines beamforming characteristics for more than one radio head from a single calibration signal.

In another embodiment, where the calibration signal from the IRHs 115 is too low to be detected by the remaining radio heads, the controller 110 may have the IRHs 115 walk through a plurality of beamforming characteristics to determine the best beamforming characteristics to communicate with the other radio heads of the system. For example, if IRH I is a sufficient distance away such that none of the remaining radio heads of the system receive a calibration signal, the controller 110 is unable to determine the beamforming characteristics from the received calibration signal. Thus, the controller 110 may have the IRH I apply a plurality of beamforming characteristics in an iterative manner until at least one of the remaining radio heads receives a calibration signal from the IRH I. In one embodiment, the iterative beamforming characteristics are vectors that are orthogonal to one another. In another embodiment, the controller 110 iterates through the various beamforming characteristics to ensure that any possible radio heads within communication distance are determined within a three dimensional area around the IRH I. If the controller 110 is unable to find another radio head within communication distance of the IRH I, the controller 110 may place the IRH in a low power state.

In one embodiment, once the controller 110 has determined initial beamforming characteristics for IRH I, the controller 110 may continue to apply different beamforming characteristics in order to find optimal beamforming characteristics between IRH I and the one or more radio heads. Stated differently, the controller 110 is capable of fine tuning the beamforming characteristics such that optimal beamforming characteristics may be found. In another embodiment, the controller 110 iterates through the beamforming characteristics until a maximum SNR is found. While beamforming has been described with reference to one of the IRHs 115, a person skilled in the art will appreciate that any of the radio heads of the system may beamform towards any one or more of the other radio heads of the system.

Figure 4B:
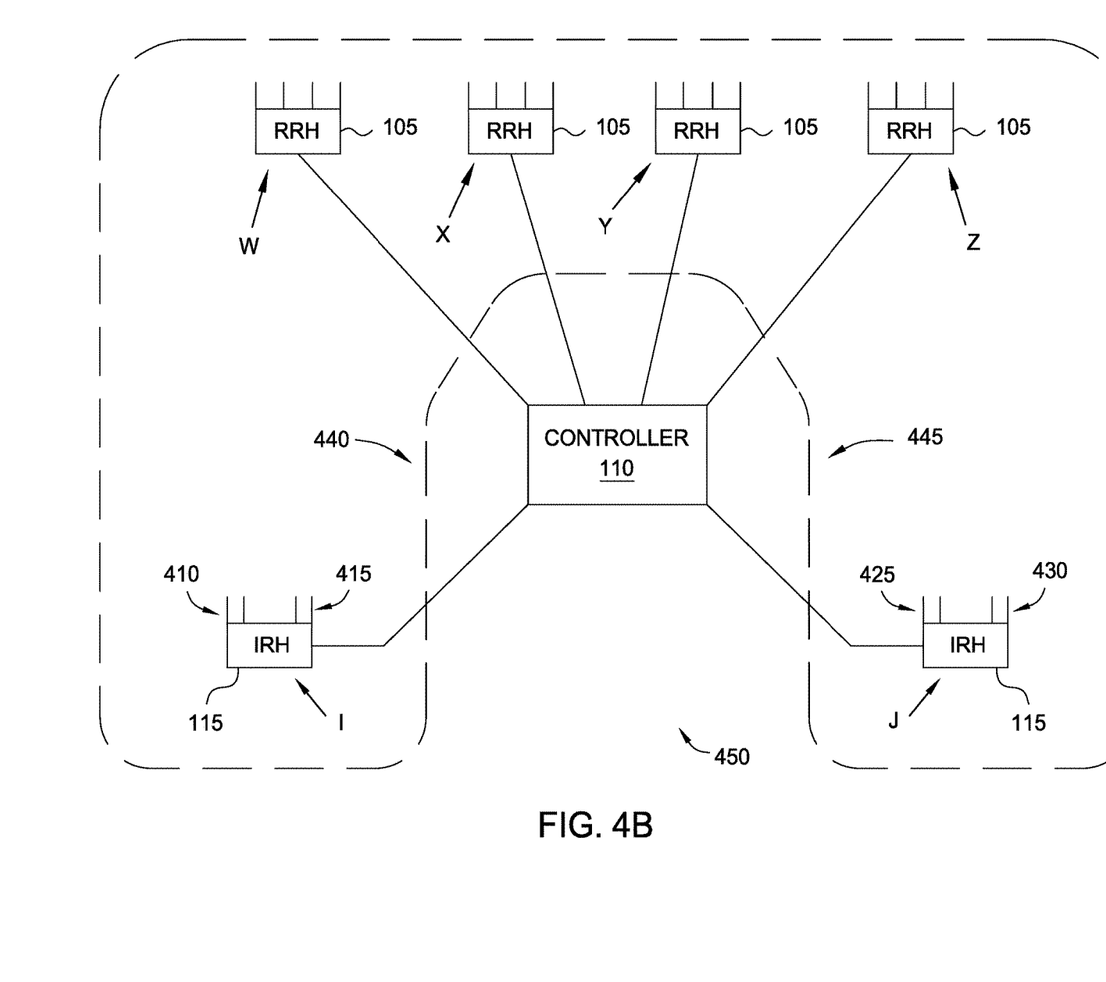

FIG. 4B illustrates one embodiment of a wireless system 450. As shown, the wireless signal propagation between the RRHs 105 and the IRHs 115 are now interconnected. That is, wireless signal propagation 440 connects the IRH I with the RRHs 105, and wireless signal propagation 445 connects the IRH J with the RRHs 105. Thus, in one embodiment, the beamforming increases the strength of the wireless signal propagation among the radio heads of system 450 such that the IRHs 115 may now be capable of communicating with the RRHs 105. In another embodiment, the beamforming avoid interference so as to improve the signal to noise ratio of the received signal instead of merely increasing the signal strength. While the wireless signal propagations have been shown as having a boxy structure, these are merely representations of the wireless signal propagation, and a person having skill in the art would appreciate the wireless signal propagation may take any suitable form. Further, the wireless signal propagations may take any form among the radio heads and should not be limited to the embodiments shown in FIGS. 4A and 4B.

At block 335, the radio heads re-transmit the calibration signals. In one embodiment, all the RHs of the system transmit the calibration signal in a round robin fashion while beamforming. In another embodiment, the RHs I, J, W, X, Y, and Z each take turns transmitting the calibration signal to the antennas of the other RHs in a round robin fashion. In further embodiment, the periods in which the RHs transmit are non-overlapping such that only a single RH is transmitting at a time. By beamforming among the radio heads of the wireless network, the radio heads improve the wireless signal propagation so that the calibration signals sent from the IRHs 115 are received by the remaining radio heads. That is, the constructive interference created via beamforming improves the strength of the wireless signal such that the calibration signal sent from the IRHs 115 is now strong enough to be received with sufficient strength at the remaining radio heads. For example, the calibration signal sent by IRH I is received by RHs J, W, X, Y, and Z. Thus, in one embodiment, all the radio heads of the wireless system are capable of receiving calibration signals from the IRHs 115 so that the entire wireless network may be calibrated as a single network. In another embodiment, the IRHs 115 are only capable of sending a calibration signal to the closest RH within the system.

At block 340, the radio heads of the wireless network are calibrated. In one embodiment, the RRHs 105 and the IRHs 115 are calibrated in the same manner as described above with reference to block 320. That is, since each of the RHs has received a signal from the remaining RHs which allows the RH to determine the receiver gain, as well as the channel estimates, the controller can use the reciprocity described above to solve for the transmitter gain. Thus, the determined calibration coefficients are used to determine the gains of the antennas. In one embodiment, the calibration coefficients are complex numbers that represent the phase and amplitude adjustment required for each receive and transmit path so that the channel becomes reciprocal among the radio heads of the wireless system. In another embodiment, the channel estimates are used to determine the implicit channel (i.e., the uplink channel) measurements among the RHs of the wireless system and calibrate the implicit channel measurements to determine the downlink channel. In this manner, the RHs I, J, W, X, Y, and Z are calibrated together.

At block 345 the calibrated RHs communicate with one or more client devices. In one embodiment, the calibrated RHs communicate with the client devices using beamforming. The method concludes after block 345.

Figure 5:
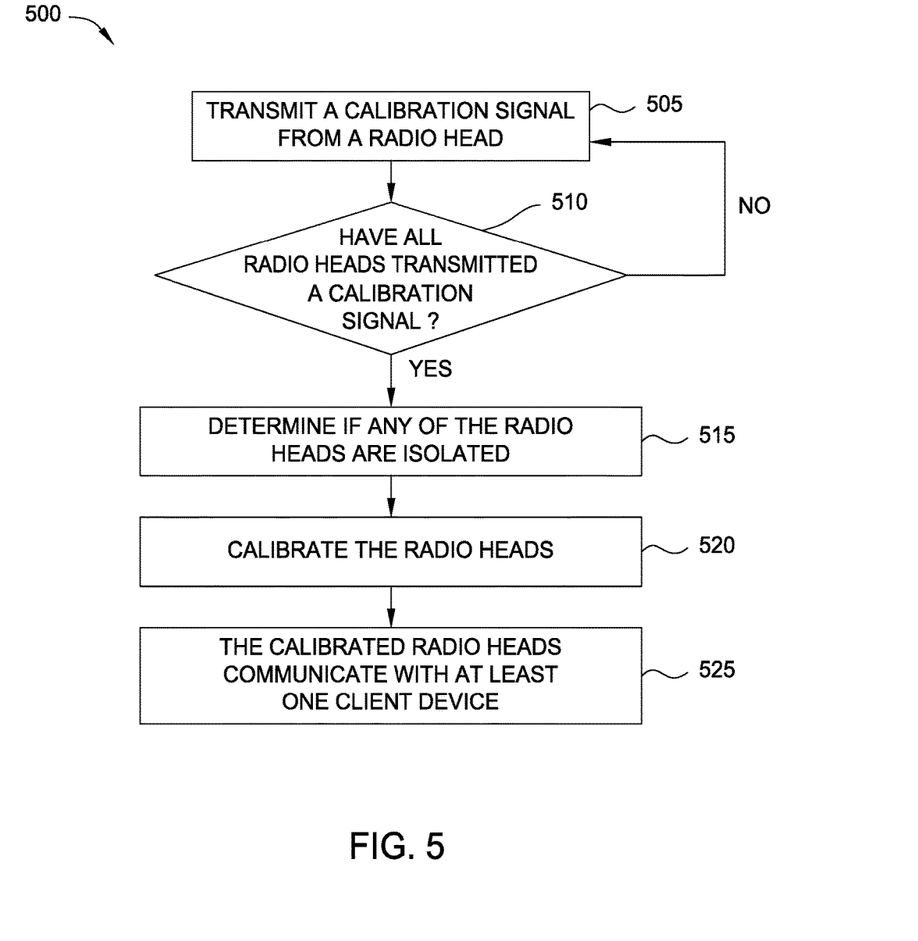
FIG. 5 is a method of calibrating a plurality of radio heads in a wireless system, according to one embodiment disclosed herein.

FIG. 5 illustrates a method 500 for calibrating the RRHs 105 and the IRHs 115 of FIG. 1. For ease of explanation, the RRHs 105 will again be referred to as W, X, Y, and Z; while the two IRHs 115 will be referred to as I and J.

The method begins at block 505, where a first RH transmits a calibration signal. In one embodiment, the calibration signal is a calibration packet, which is a null data packet with a PHY preamble containing several 802.11 wireless standard training fields to fully sound the channel. For example, W transmits a calibration signal via the four antennas of W that is received at X, Y, and Z, as well as I and J. Thus, each antenna of X, Y, and Z receives a calibration signal from each of the four antennas of W. Therefore, $X_1$ receives a separate signal from $W_1$, $W_2$, $W_3$, and $W_4$; $X_2$ receives a separate calibration signal from $W_1$, $W_2$, $W_3$, and $W_4$ and so forth for each of the antennas of X, Y, and Z. Based upon each of the received signals, a respective channel estimate representing the channel characteristics is determined between the antennas that sent the calibration signals and the antennas that received the calibration signals. The radio heads I and J may not receive the calibration signals sent by the other radio heads because RHs I and J are isolated as will be discussed in more detail below. In one embodiment, the channel estimates are derived from the preamble of the calibration signal and stored in a matrix for later calibration. In another embodiment, the RHs I, J, W, X, Y, and Z each take turns transmitting the calibration signal. In further embodiment, the periods in which the RHs transmit are non-overlapping such that only a single RH is transmitting at a time.

After block 510, if all the RHs of the system have transmitted a calibration signal, the method continues to block 515. However, if all the RHs of the system have not transmitted a calibration signal, the method returns to block 505 to allow the remaining RHs to transmit a calibration signal. Stated differently, at block 510 the RHs transmit a calibration signal one at a time in a round robin fashion until all RHs have transmitted a calibration signal. In an alternative embodiment, the RHs transmit until an isolated RH is determined. Thus, blocks 510 and 515 are combined into a single step. In this manner, not all RHs need to communicate a calibration signal before calibrating the radio heads.

At block 515, the method determines if any of the RHs are isolated from the remaining RHs. That is, the radio heads may be placed far enough apart (e.g., isolated) from one another that the channel estimates from individual antenna transmissions, which are non-directional, between the radio heads may not yield sufficient channel estimates (e.g., the channel estimate does not have enough power; too much interference exists; etc.). In one embodiment, a RH is considered isolated when the calibration signal from the RH is not strong enough to trigger a start of packet (SOP) detect. In this example, RH I broadcasts a calibration signal to the remaining RHs J, W, X, Y, and Z, but RH I is sufficiently far away such that the calibration signal degrades to the point that the signal is no longer detectable by the remaining RHs.

At block 520, upon determining there is at least one isolated radio head (i.e., IRHs 115), the system calibrates the radio heads of the system. In one embodiment, every radio head of the system is calibrated as an isolated radio head regardless if the radio head is actually isolated. That is, as described above with regards to block 325 of FIG. 3, each radio head is self-calibrated by calibrating a subset of the antennas of each radio head as individual radio heads. However, self-calibrated radio heads require low transmit and receive gains due to the small distance between the antennas of a radio head. Thus, the calibration coefficients determined for intra-radio head calibration (i.e., calibration coefficients for the antennas of a radio head) are not ideal for inter-radio head calibration (i.e., between radio heads) because distant transmissions between radio heads require high transmit and receive gains. Therefore, once calibration coefficients for the self-calibrating heads (i.e., intra-radio head coefficients) are determined, a scalar or stitching coefficient may be used to determine the calibration coefficients (i.e., inter-radio head coefficients) for each of the radio heads. In this manner, the intra-radio head calibration is adjusted by a scalar coefficient in order to calibrate the radio heads of the system. Stated differently, the scalar coefficient allows the isolated radio heads to be stitched together into a single cohesive system of radio heads. In one embodiment, a respective scalar coefficient is determined for each radio head based on the intra-radio head calibration coefficients of the radio heads of the system.

As an example, consider two radio heads using the equation to determine channel estimates as described above $A = R_A H_{BA} T_B = R_A (H_{AB})^T T_B$. This equation can be redefined as the following equation based on an assumption of the diagonality of gain matrices:

$$A\ \mathrm{diag}(c_B) = \mathrm{diag}(c_A) B^T$$

As described above, the radio heads A and B have been self-calibrated, and the self-calibration coefficients will be referred to as $\{\tilde{c}_A, \tilde{c}_B\}$. However, in order for the radio heads to be properly calibrated with one another, a scalar or stitching coefficient needs to be determined. Adding the stitching coefficient to the aforementioned equation results in the following equation:

$$A\ \mathrm{diag}(\tilde{c}_B) = \alpha \cdot \mathrm{diag}(\tilde{c}_A) B^T$$

The above equation results in an overdetermined system of linear equations for $\alpha$ given $\{\tilde{c}_A, \tilde{c}_B\}$. The stitched coefficient for the two heads may be represented as $[\alpha \cdot \tilde{c}_A, \tilde{c}_B]$. The stitching factor $\alpha$ has inherent noise immunity due to the overdetermined nature of the equations. The stitching factor $\alpha$ corrects the intra-head calibration coefficients for inter-radio head communication. Thus, the inter-radio head calibration coefficients may be determined by applying the stitching factor $\alpha$ to the previously determined intra-radio head calibration coefficients. In one embodiment, the stitching factor $\alpha$ is an adjustment to the gain of a radio head to ensure the gain for each radio head in the system is equivalent. In another embodiment, the stitching factor $\alpha$ is a phase and amplitude adjustment for the radio heads of the system. In a further embodiment, the stitching factor is a complex number that represents the phase and amplitude adjustment for the radio heads of the system.

For multiple radio heads (H radio heads), we need to solve for (H−1) stitching factors, given the intra-radio head calibration coefficients for the radio heads. Repeating the example above with H=4 radio heads (A, B, C, D):

$$\underbrace{\begin{bmatrix} F_A(B) & G_B(A) & 0 & 0 \\ F_A(C) & 0 & G_C(A) & 0 \\ F_A(D) & 0 & 0 & G_D(A) \\ 0 & F_B(C) & G_C(B) & 0 \\ 0 & F_B(D) & 0 & G_D(B) \\ 0 & 0 & F_C(D) & G_D(C) \end{bmatrix}}_{Z_{system}} \begin{bmatrix} c_A \\ c_B \\ c_C \\ c_D \end{bmatrix} = 0$$

The coefficient vector is the calibration coefficients for the system, which are related to the intra-radio head calibration coefficients by the stitched coefficients $\{\tilde{c}_A = c_A, \alpha_B \cdot \tilde{c}_B = c_B, \alpha_c \cdot \tilde{c}_c = c_c, \alpha_D \cdot \tilde{c}_D = c_D\}$. The M overdetermined equations for the stitching factors $\{\alpha_B, \alpha_c, \alpha_D\}$ take the form:

$$\begin{bmatrix} G_B(A)\tilde{c}_B & 0 & 0 \\ 0 & G_C(A)\tilde{c}_C & 0 \\ 0 & 0 & G_D(A)\tilde{c}_D \\ F_B(C)\tilde{c}_B & G_C(B)\tilde{c}_C & 0 \\ F_B(D)\tilde{c}_B & 0 & G_D(B)\tilde{c}_D \\ 0 & F_C(D)\tilde{c}_C & G_D(C)\tilde{c}_D \end{bmatrix} \begin{bmatrix} \alpha_B \\ \alpha_C \\ \alpha_D \end{bmatrix} = -\begin{bmatrix} F_A(B)\tilde{c}_A \\ F_A(C)\tilde{c}_A \\ F_A(D)\tilde{c}_A \\ 0 \\ 0 \\ 0 \end{bmatrix}$$

Each block element of the above matrix (for example: $\{G_B(A)\tilde{c}_B, F_A(B)\tilde{c}_A\}$ is $M^2 \times 1$, in which M is the number of antennas per head. With four radio heads, the coefficient matrix for stitching factors is $6M^2 \times 3$, with H radio heads it is a $(H(H-1)M^2/2) \times (H-1)$ matrix. The set of linear equations above are solved using typical methods such as least squares to determine the stitched coefficients. Applying the determined stitched coefficients to the previously determined intra-radio head calibration coefficients results in the inter-radio head calibration coefficients for radio heads A, B, C, and D. Thus, the inter-radio head calibration coefficients for each of the radio heads of the system are determined by applying the determined scalar coefficients to the previously determined intra-radio head calibrations.

Applying the above math to the system of FIG. 1, the inter-radio head calibration coefficients can be determined from the intra-radio head calibration coefficients that were determined for each of the RRHs 105 and the IRHs 115. Once the inter-radio head calibration coefficients are determined from the matrix, the gains can be determined for each of the respective RHs. That is, the effective channel (observed at baseband) from a first RH A to a second RH B is the product of transmitter gain of RH A multiplied by the propagation channel multiplied by the receiver gain of RH B. Thus, rewritten in equation form, $B = R_B H_{AB} T_A$ where B is the channel estimate at RH B when radio head A is transmitting. Since each of the RHs has received a signal from the remaining RHs which allows the RH to determine the receiver gain, as well as the channel estimates, the controller can use the reciprocity described above to solve for the transmitter gain. Thus, the determined calibration coefficients may be used to determine the gains of the antennas for each of the radio heads.

In one embodiment, the calibration coefficients are complex numbers that represent the phase and amplitude adjustment required for each receive and transmit path so that the channel becomes reciprocal among the plurality of RHs. In another embodiment, the channel estimates are used to determine the implicit channel (i.e., the uplink channel) measurements among the RHs and calibrate the implicit channel measurements to determine the downlink channel.

At block 525, the calibrated RHs communicate with one or more client devices. In one embodiment, the RHs send data packets to the client devices, as well as receive data packets. In another embodiment, the calibrated RHs communicate with the client devices using beamforming. The method concludes after block 525.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for calibrating a first radio head and a second radio head, wherein the first radio head and the second radio head each comprises a respective plurality of antennas, the method comprising:
   transmitting, via the plurality of antennas of the first radio head, a first calibration signal to the second radio head;
   upon determining the first radio head is isolated from the second radio head, re-transmitting the first calibration signal via beamforming of the plurality of antennas of the first radio head;
   receiving the re-transmitted calibration signal using the plurality of antennas of the second radio head;
   transmitting, via the plurality of antennas of the second radio head, a second calibration signal to the first radio head; and
   calibrating the first radio head and the second radio head based on a calibration vector determined from the first and second calibration signals received at the respective plurality of antennas of the first radio head and the second radio head.

2. The method according to claim 1, further comprising prior to re-transmitting the first calibration signal via beamforming:
   transmitting, via a first subset of the plurality of antennas of the first radio head, a third calibration signal to a second subset of the plurality of antennas of the first radio head,
   transmitting, via the second subset of the plurality of antennas of the first radio head, a fourth calibration signal to the first subset of the plurality of antennas of the first radio head, and
   calibrating the first and second subset of the plurality of antennas of the first radio head based on the received third and fourth calibration signals.

3. The method according to claim 2, further comprising:
   transmitting, via a first subset of the plurality of antennas of the second radio head, a fifth calibration signal to a second subset of the plurality of antennas of the second radio head;
   transmitting, via the second subset of the plurality of antennas of the second radio head, a sixth calibration signal to the first subset of the plurality of antennas of the second radio head;
   calibrating the first and second subset of the plurality of antennas of the second radio head based on the received fifth and sixth calibration signals;
   determining a stitching coefficient for the first and second radio heads based on the respective calibrated subset of antennas of the first and second radio heads; and
   calibrating the first and second radio heads by applying the stitching coefficient to the respective subsets of antennas of the first and second radio heads.

4. The method according to claim 1, wherein calibrating the first radio head and the second radio head further comprises:
   determining a respective channel estimate for each of the plurality of antennas of the first radio head and the second radio head;
   forming a matrix comprising the plurality of channel estimates; and
   determining an eigenvector comprising the smallest eigenvalue of the matrix.

5. The method according to claim 4, wherein determining the respective channel estimate for each of the plurality of antennas further comprises:
   determining the respective channel estimate for each of the plurality of antennas of the first radio head based on the received calibration signal from each of the plurality of antennas of the second radio head; and
   determining the respective channel estimate for each of the plurality of antennas of the second radio head based on the received calibration signal from each of the plurality of antennas of the first radio head.

6. The method according to claim 1, wherein calibrating the first and second radio heads further comprises:
   determining a respective first gain for each of the plurality of antennas of the first radio head and a respective second gain for each of the plurality of antennas of the second radio head; and
   determining a respective first phase for each of the plurality of antennas of the first radio head and a respective second phase for each of the plurality of antennas of the second radio head.

7. The method according to claim 1, wherein the first radio head and the second radio head are communicatively coupled with a controller, wherein the controller is configured to:
   process data received at the first radio head and the second radio head,
   determine the first radio head is isolated, and
   calibrate the first and second radio head.

8. A system, comprising:
   a processor; and
   a memory comprising instructions which, when executed on the processor, performs an operation for calibrating a first radio head and a second radio head, wherein the first radio head and the second radio head each comprises a respective plurality of antennas, the operation comprising:
      transmitting, via the plurality of antennas of the first radio head, a first calibration signal to the second radio head;
      upon determining the first radio head is isolated from the second radio head, re-transmitting the first calibration signal via beamforming of the plurality of antennas of the first radio head;
      receiving the re-transmitted calibration signal using the plurality of antennas of the second radio head;
      transmitting, via the plurality of antennas of the second radio head, a second calibration signal to the first radio head; and
      calibrating the first radio head and the second radio head based on a calibration vector determined from the first and second calibration signals received at the respective plurality of antennas of the first radio head and the second radio head.

9. The system according to claim 8, the operation further comprising prior to re-transmitting the first calibration signal via beamforming:
   transmitting, via a first subset of the plurality of antennas of the first radio head, a third calibration signal to a second subset of the plurality of antennas of the first radio head,
   transmitting, via the second subset of the plurality of antennas of the first radio head, a fourth calibration signal to the first subset of the plurality of antennas of the first radio head, and
   calibrating the first and second subset of the plurality of antennas of the first radio head based on the received third and fourth calibration signals.

10. The system according to claim 9, the operation further comprising:
   transmitting, via a first subset of the plurality of antennas of the second radio head, a fifth calibration signal to a second subset of the plurality of antennas of the second radio head;
   transmitting, via the second subset of the plurality of antennas of the second radio head, a sixth calibration signal to the first subset of the plurality of antennas of the second radio head;
   calibrating the first and second subset of the plurality of antennas of the second radio head based on the received fifth and sixth calibration signals;
   determining a stitching coefficient for the first and second radio heads based on the respective calibrated subset of antennas of the first and second radio heads; and
   calibrating the first and second radio heads by applying the stitching coefficient to the respective subsets of antennas of the first and second radio heads.

11. The system according to claim 8, wherein calibrating the first radio head and the second radio head further comprises:
   determining a respective channel estimate for each of the plurality of antennas of the first radio head and the second radio head;
   forming a matrix comprising the plurality of channel estimates; and
   determining an eigenvector comprising the smallest eigenvalue of the matrix.

12. The system according to claim 11, wherein determining the respective channel estimate for each of the plurality of antennas further comprises:
   determining the respective channel estimate for each of the plurality of antennas of the first radio head based on the received calibration signal from each of the plurality of antennas of the second radio head; and
   determining the respective channel estimate for each of the plurality of antennas of the second radio head based on the received calibration signal from each of the plurality of antennas of the first radio head.

13. The system according to claim 8, wherein calibrating the first and second radio heads further comprises:
   determining a respective first gain for each of the plurality of antennas of the first radio head and a respective second gain for each of the plurality of antennas of the second radio head; and
   determining a respective first phase for each of the plurality of antennas of the first radio head and a respective second phase for each of the plurality of antennas of the second radio head.

14. The system according to claim 8, wherein the first radio head and the second radio head are communicatively coupled with a controller, wherein the controller is configured to:
   process data received at the first radio head and the second radio head,
   determine the first radio head is isolated, and
   calibrate the first and second radio heads.

15. A computer program product for calibrating a first radio head and a second radio head, wherein the first radio head and the second radio head each comprises a respective plurality of antennas, the computer program product comprising a non-transitory computer-readable medium program having program instructions embodied therewith, the program instructions executable by a processor to perform an operation comprising:
   transmitting, via the plurality of antennas of the first radio head, a first calibration signal to the second radio head;
   upon determining the first radio head is isolated from the second radio head, re-transmitting the first calibration signal via beamforming of the plurality of antennas of the first radio head;
   receiving the re-transmitted calibration signal using the plurality of antennas of the second radio head;
   transmitting, via the plurality of antennas of the second radio head, a second calibration signal to the first radio head; and calibrating the first radio head and the second radio head based on a calibration vector determined from the first and second calibration signals received at the respective plurality of antennas of the first radio head and the second radio head.

16. The computer program product according to claim 15, the operation further comprising prior to re-transmitting the first calibration signal via beamforming:
    transmitting, via a first subset of the plurality of antennas of the first radio head, a third calibration signal to a second subset of the plurality of antennas of the first radio head,
    transmitting, via the second subset of the plurality of antennas of the first radio head, a fourth calibration signal to the first subset of the plurality of antennas of the first radio head, and
    calibrating the first and second subset of the plurality of antennas of the first radio head based on the received third and fourth calibration signals.

17. The computer program product according to claim 16, the operation further comprising:
    transmitting, via a first subset of the plurality of antennas of the second radio head, a fifth calibration signal to a second subset of the plurality of antennas of the second radio head;
    transmitting, via the second subset of the plurality of antennas of the second radio head, a sixth calibration signal to the first subset of the plurality of antennas of the second radio head;
    calibrating the first and second subset of the plurality of antennas of the second radio head based on the received fifth and sixth calibration signals;
    determining a stitching coefficient for the first and second radio heads based on the respective calibrated subset of antennas of the first and second radio heads; and
    calibrating the first and second radio heads by applying the stitching coefficient to the respective subsets of antennas of the first and second radio heads.

18. The computer program product according to claim 15, wherein calibrating the first radio head and the second radio head further comprises:
    determining a respective channel estimate for each of the plurality of antennas of the first radio head and the second radio head;
    forming a matrix comprising the plurality of channel estimates; and
    determining an eigenvector comprising the smallest eigenvalue of the matrix.

19. The computer program product according to claim 18, wherein determining the respective channel estimate for each of the plurality of antennas further comprises:
    determining the respective channel estimate for each of the plurality of antennas of the first radio head based on the received calibration signal from each of the plurality of antennas of the second radio head; and
    determining the respective channel estimate for each of the plurality of antennas of the second radio head based on the received calibration signal from each of the plurality of antennas of the first radio head.

20. The computer program product according to claim 15, wherein calibrating the first and second radio heads further comprises:
    determining a respective first gain for each of the plurality of antennas of the first radio head and a respective second gain for each of the plurality of antennas of the second radio head; and
    determining a respective first phase for each of the plurality of antennas of the first radio head and a respective second phase for each of the plurality of antennas of the second radio head.

* * * * *

UNITED STATES PATENT AND TRADEMARK OFFICE
CERTIFICATE OF CORRECTION

PATENT NO. : 9,991,972 B1
APPLICATION NO. : 15/497969
DATED : June 5, 2018
INVENTOR(S) : Mithat C. Dogan et al.

It is certified that error appears in the above-identified patent and that said Letters Patent is hereby corrected as shown below:

On the Title Page

In Column 1, under Notice, Line 3, after "0 days." delete "days.".

In the Specification

In Column 9, Line 65, delete "whenM>1." and insert -- when M>1. --, therefor.

In the Claims

In Column 22, Lines 53-54, in Claim 15, after "medium" delete "program".

Signed and Sealed this
Twenty-fifth Day of September, 2018

Andrei Iancu
*Director of the United States Patent and Trademark Office*